United States Patent
Meyer et al.

(10) Patent No.: US 11,427,087 B2
(45) Date of Patent: Aug. 30, 2022

(54) VEHICLE PROPULSION TORQUE CONTROL SYSTEMS AND METHODS

(71) Applicant: Ford Global Technologies, LLC, Dearborn, MI (US)

(72) Inventors: Jason Meyer, Canton, MI (US); Jeffrey Allen Doering, Canton, MI (US); Maruthi Thiruninravur Ravichandran, Kalamazoo, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 380 days.

(21) Appl. No.: 16/284,251

(22) Filed: Feb. 25, 2019

(65) Prior Publication Data
US 2020/0269702 A1    Aug. 27, 2020

(51) Int. Cl.
| | | |
|---|---|---|
| *B60L 15/20* | (2006.01) | |
| *B60W 30/188* | (2012.01) | |
| *B60W 10/06* | (2006.01) | |
| *B60W 10/08* | (2006.01) | |
| *B60W 50/06* | (2006.01) | |
| *B60W 50/12* | (2012.01) | |

(52) U.S. Cl.
CPC ............ *B60L 15/20* (2013.01); *B60W 10/06* (2013.01); *B60W 10/08* (2013.01); *B60W 30/1882* (2013.01); *B60L 2240/423* (2013.01); *B60W 50/06* (2013.01); *B60W 50/12* (2013.01); *B60W 2710/083* (2013.01)

(58) Field of Classification Search
CPC .............................. B60W 10/06; B60W 10/08
See application file for complete search history.

(56) References Cited

U.S. PATENT DOCUMENTS

| | | | |
|---|---|---|---|
| 8,733,183 B1 | 5/2014 | Yanakiev et al. | |
| 8,954,215 B2 | 2/2015 | Yamazaki et al. | |
| 9,154,072 B2 | 10/2015 | Jung et al. | |
| 9,707,968 B2 | 7/2017 | Wall et al. | |
| 2008/0257619 A1* | 10/2008 | Yamazaki ............. | B60W 10/08 180/65.265 |
| 2013/0297111 A1* | 11/2013 | Yamazaki ............. | B60W 20/00 701/22 |
| 2017/0066333 A1* | 3/2017 | Kim ........................ | B60L 50/16 |

* cited by examiner

*Primary Examiner* — Imran K Mustafa
(74) *Attorney, Agent, or Firm* — David B. Kelley; Brooks Kushman P.C.

(57) ABSTRACT

A vehicle propulsion system configured to generate wheel torque includes an engine arranged to output a first propulsion torque to a transmission and an electric motor arranged to output a second propulsion torque downstream of the transmission. The vehicle propulsion system also includes a controller programmed to, in response to detecting a lash crossing associated with one of the electric motor and the transmission, set a torque slew rate of the other one of the electric motor and transmission such that each of the electric motor and transmission undergoes lash crossings at different points in time.

16 Claims, 6 Drawing Sheets

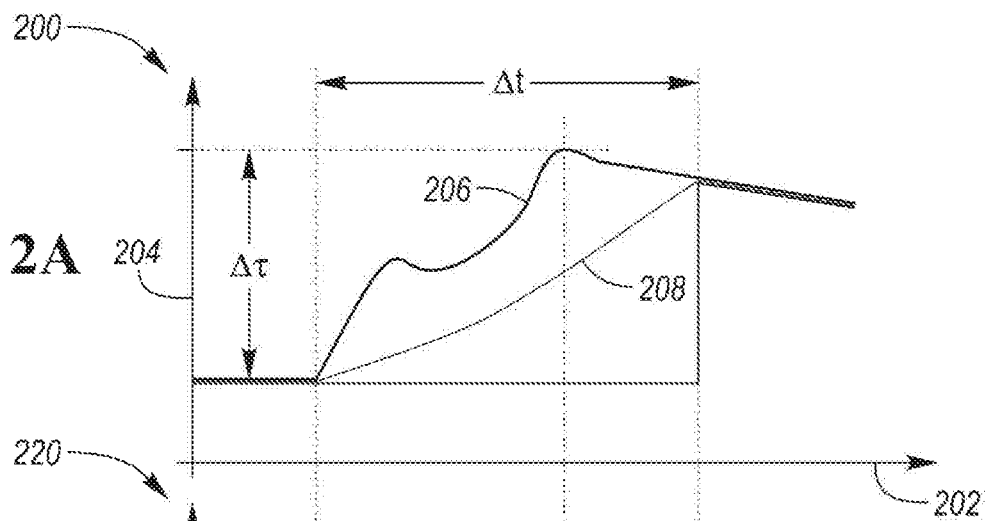
FIG. 2A
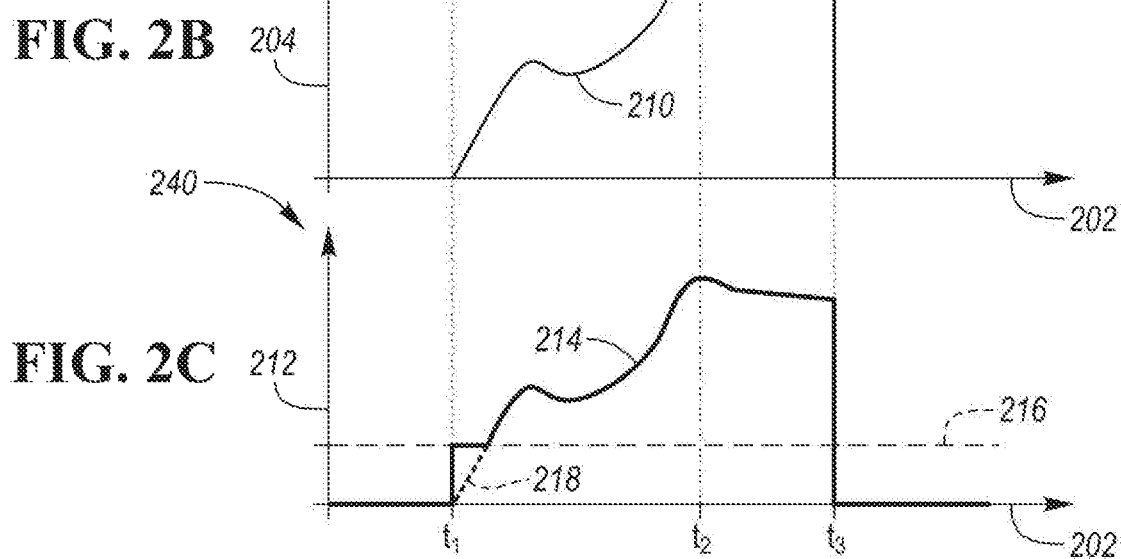
FIG. 2B
FIG. 2C
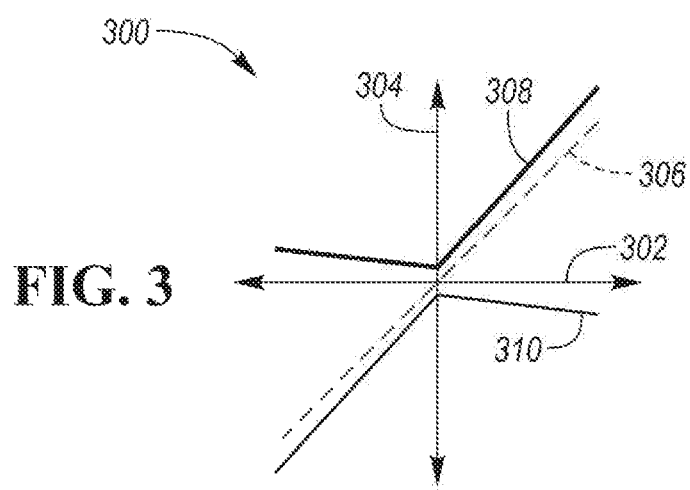
FIG. 3

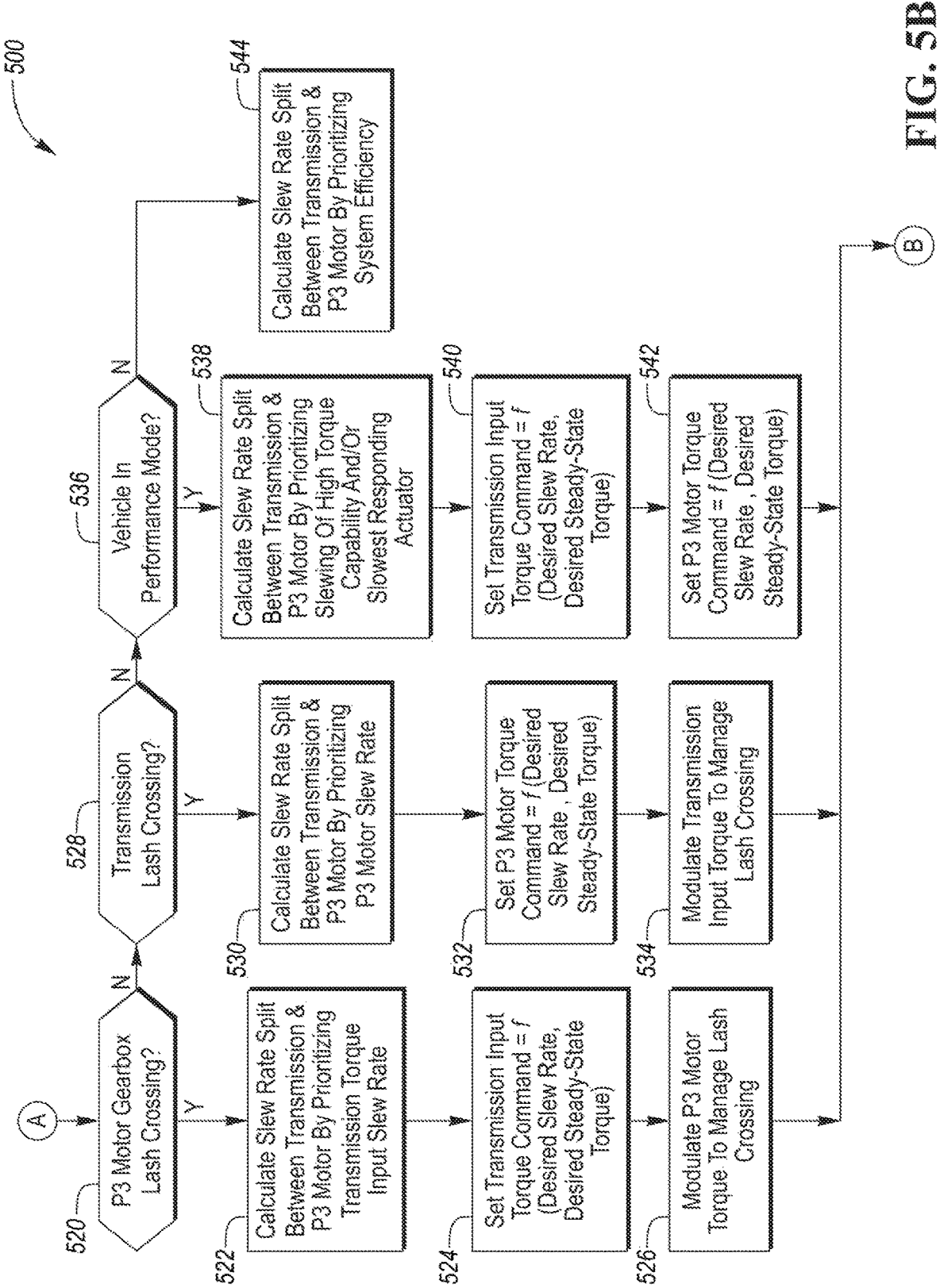

VEHICLE PROPULSION TORQUE CONTROL SYSTEMS AND METHODS

TECHNICAL FIELD

The present disclosure relates to a system for controlling torque output of a vehicle propulsion system.

BACKGROUND

Hybrid electric vehicles (HEVs) may include a propulsion system including an internal combustion engine, one or more electric machines to output torque to propel the vehicle. These vehicles often rely on a network of controllers to perform an array of tasks related to management of propulsion system operation. On-off switching of each of the propulsion sources as driving demand changes may cause system excitation that is perceivable to a driver. Additionally, sudden changes in the desired allocation of torque output between the devices may also contribute to disturbances. Sudden acceleration and/or deceleration requests by a driver may lead to undesirable excitation of the propulsion system.

SUMMARY

A vehicle propulsion system configured to generate wheel torque includes an engine arranged to output a first propulsion torque to a transmission and an electric motor arranged to output a second propulsion torque downstream of the transmission. The vehicle propulsion system also includes a controller programmed to, in response to detecting a lash crossing associated with one of the electric motor and the transmission, set a torque slew rate of the other one of the electric motor and transmission to prevent lash crossing of the other of the motor and transmission during the detected lash crossing.

A vehicle propulsion system includes an engine arranged to output a first propulsion torque to a final drive unit through a transmission, an electric motor arranged to output a second propulsion torque to the final drive unit through a motor gearbox, and an integrated starter generator (ISG) arranged to output a third propulsion torque to the final drive unit through the transmission. The vehicle propulsion system also includes a controller programmed to allocate output between the first, second, and third propulsion torques to satisfy a desired wheel torque and cause the transmission, motor gearbox, and the final drive unit to each undergo a lash crossing at different times.

A method for controlling propulsion system torque output includes setting a target torque output allocation between an engine and an electric motor to satisfy a driver torque demand. The method also includes, in response to one of the engine and the electric motor undergoing a lash crossing, setting a torque slew rate of the other of the engine and electric motor to cause each of transmission the electric motor and to undergo lash crossings at different points in time.

BRIEF DESCRIPTION OF THE DRAWINGS

FIGS. 2A through 2C are plots of torque versus time.

FIG. 3 is a plot of actuator torque output versus desired wheel output torque.

FIGS. 5A through 5C are flow chart of an algorithm to control propulsion system torque output.

DETAILED DESCRIPTION

Figure 1:
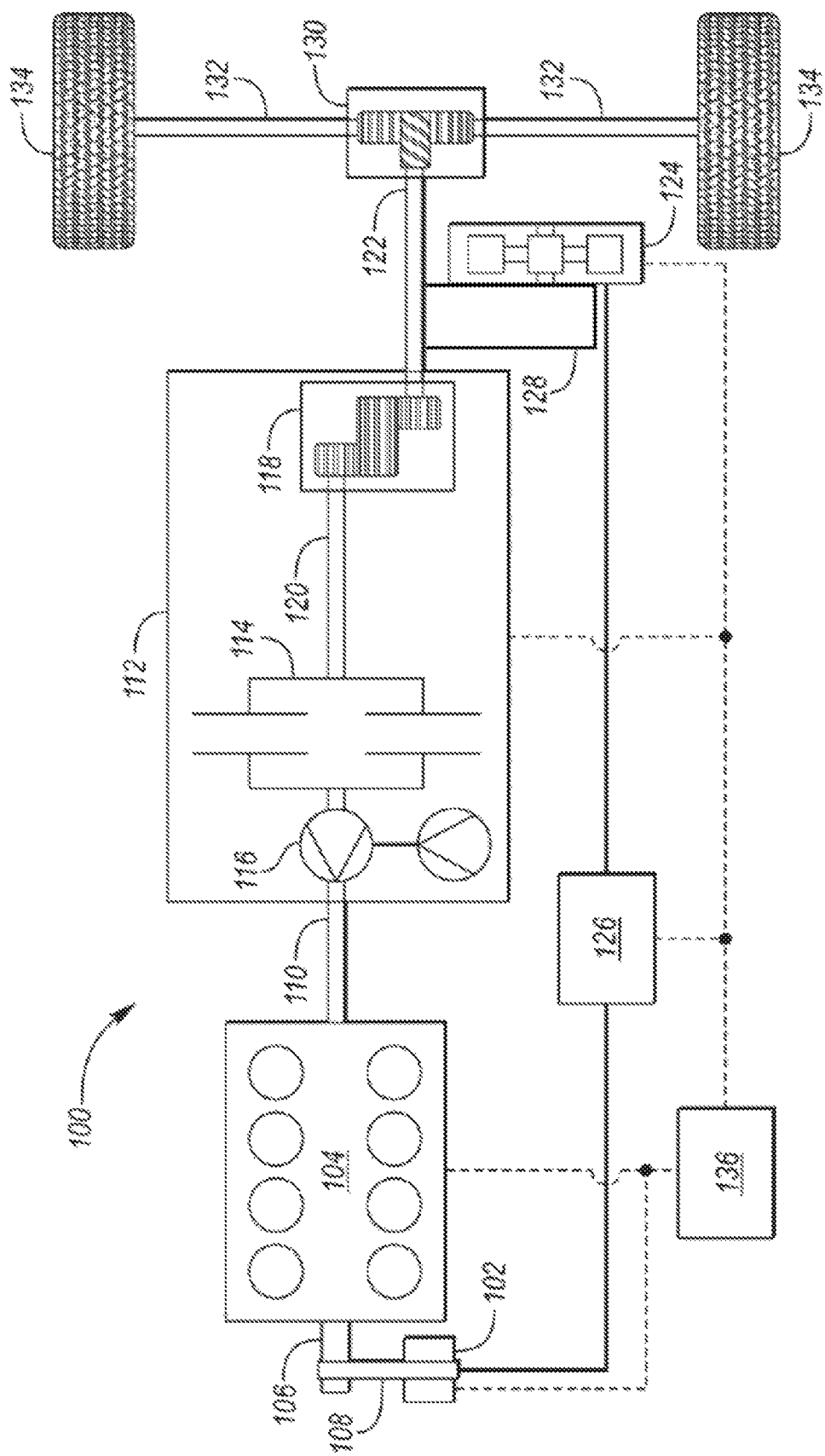
FIG. 1 is a schematic diagram of a vehicle propulsion system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Automotive drivetrains may include multiple geared teeth connections to transfer torque such as transmission gear systems, engine connections, electric motor connections, and other driveline joints. These connections may exhibit a "deadband" zone when the direction of torque applied to the connection changes. Such deadband zones relate to a discontinuity of torque transmitted through the driveline. Further contributing to the excitation is compliance of certain driveline components. The occurrence of deadband zones along the driveline may manifest as driveline backlash or "lash" due to lost motion caused by slack or clearance within various driveline components when torque changes direction, such as during a vehicle acceleration or deceleration event. As torque changes from positive to negative (or vice versa), it may be referred to as a "lash crossing." Lash crossings may occur when wheel torque, or road load torque, and/or propulsion actuator torque change direction with respect to one another. Such lash crossings may be one of the key factors contributing to drivability issues such as driveline harshness and disturbance to a driver.

Generally, lash crossings can occur along a vehicle driveline when the wheel torque and a power plant torque change direction from one another. In one specific example, during vehicle deceleration, the compression braking effect of the engine applies a negative torque to the transmission which is then passed through the differential and subsequently to the road wheels. During this time, the driveline is wrapped in the negative direction. If the driver applies the accelerator pedal (i.e., creates a "tip-in" condition), the engine torque switches from negative to positive as it begins to supply torque to propel the vehicle forward. The driveline unwraps, as each driveline component changes from transmitting negative torque to transmitting positive torque. At some point during the transition, the entire driveline is considered to be in a relaxed state with zero torque applied to the wheels.

During this zero-torque region, gear teeth in the transmission, electric motor gearbox, final drive differential are not tightly coupled to their mating gears and there is some play in the driveline. As the engine continues to provide positive torque, the driveline will wrap in the positive direction. The gears are then quickly coupled which may produce a clunk or other undesirable noise and vibration related to contact at the trailing end of the lash crossing event. Moreover, compliance in one or more of the shafts may allow twist as a result of much higher torque on the engine side of the driveline relative to the road wheel side. Thus, one or more of the shafts may store energy as a spring. Once the vehicle begins to accelerate, wheel torque catches up to the torque applied by the engine and energy stored in one or more of the shafts having compliance is released quickly causing an oscillation in the opposite direction, further contributing to lash. The overall result of the lash may be an audible clunk when the gear teeth make contact, and/or a drop in wheel torque when the stored driveline energy is expended.

The scenario described above can also happen in the reverse direction. For example, in the case where a driver accelerates aggressively, then suddenly lets go of the accelerator pedal (i.e., creates a "tip-out" condition), a similar lash phenomenon may be induced. The driveshaft can go from being wrapped in the positive direction to being wrapped in the negative direction, with a similar zero-torque region and corresponding clunk during the transition. Generally, lash due to sudden acceleration condition may be more noticeable than lash corresponding to a sudden deceleration condition.

In a conventional vehicle, slowly ramping on engine torque may be used when crossing the lash zone. Other methods to reduce lash may also be used including spark retard within the engine, which may lead to reduced fuel efficiency and increased torque loading or oscillations on the engine that contribute to noise, vibration, and harshness (NVH). In a hybrid vehicle, controlling crossing lash crossing events along the driveline becomes more complex because there are multiple prime movers outputting torque to a single input shaft of the driveline (e.g., an engine combined with multiple electric machines). There may similarly be more selectably engaged gear connections associated with the multiple prime movers. Controlling lash crossing events in a hybrid vehicle is still further complicated since the driveline may be set to operate in any of several drive modes such hybrid drive propulsion, electric drive propulsion, coasting, and/or regenerative braking to charge the battery.

The present disclosure describes solutions to manage lash crossing events across the several powertrain components of a "P3" hybrid architecture such as the example shown in FIG. 1. The claimed invention may however, be applicable to other powertrain topologies. In the example of FIG. 1, hybrid vehicle 100 includes an electric motor 102 (e.g., a belt integrated starter generator, or "ISG") applied at a "P0" location to start the engine 104, and selectively supply supplemental torque. In other examples, the ISG 102 may alternatively be coupled to a "P1" location such as to the engine crankshaft (not shown) to operate as a starter. In the example of FIG. 1, the ISG 102 selectively applies torque to a shaft 106 upstream of the engine 104 via belt 108. Torque output from the ISG 102 may be applied to start the engine 102 from a nonactive state, as well as applied to supplement engine output torque when the engine 102 is in an active state.

Torque from the engine 104 is output to crankshaft 110 and transmitted to transmission 112. According to at least one example, the transmission 112 includes an internal dual clutch 114 to decouple the downstream powertrain components from the engine 104. The engine 104 can be selectively connected or disconnected to the driveline by closing or opening the dual clutch 114 to allow the engine 104 to be shutdown independent of vehicle operation. The transmission 112 may further include an oil pump 116 connected to the crankshaft 110 to provide oil flow through the transmission 112 for lubrication and hydraulic operation. Operation of the oil pump may contribute to some degree of torque loss across the transmission. The transmission 112 transfers torque to a gearbox 118 via shaft 120. In at least one example, the gearbox 118 includes internal gearing to allow for the selection of any of a number of available gear ratios for driving.

The transmission 112 outputs torque via shaft 122 to a final drive unit 130. In the example of FIG. 1, the final drive unit 130 is a rear differential unit (RDU) that includes internal gearing to allocate torque output between side shafts 132 which in turn pass torque to road wheels 134.

A propulsion electric motor 124 is also connected at a "P3" location downstream of the transmission 112. The electric motor 124 may operate as a generator by receiving torque from the engine torque via shaft 122, for example during regenerative braking, and deliver power to the traction battery 126. In other modes, the electric motor 124 may receive power from the traction battery 126 and output propulsion torque via shaft 122. The motor 124 may include a motor gearbox 128 to alter the gear ratio of torque output to the final drive unit 130. Throughout this description, the terms generator and motor are used merely as labels to identify these components. Both the ISG 102 and the electric motor 124 are reversible electric machines capable of both converting mechanical shaft power into electrical power, and capable of converting electrical power into mechanical shaft power.

The battery 126 includes two-way electrical connections, such that it can supply energy to power each of the ISG 102 and the electric motor 124. The electric motor 124 uses the energy to provide an assistive torque actuation to the engine 104. The two-way connections also allow the battery to receive and store energy. For example, electrical energy generated from torque absorbed by the electric motor 124 can be transferred to the battery 126 through the two-way electrical connections.

Controller 136 may be a single controller or a system of cooperating controllers that regulate operation of the propulsion system of vehicle 100. In some examples a vehicle system controller (VSC) interprets driver requests including gear selection (PRNDL) and an accelerator pedal position signal (APPS) to interpret the driver's intention of wheel torque. In other examples a brake system control module (BSCM) receives driver deceleration requests via brake pedal position signal (BPPS) and outputs commands pertaining to vehicle deceleration. In further examples, a high-voltage battery control module (BCM) monitors battery temperature, voltage, current, state of charge (SOC), and then outputs commands pertaining to maximum allowable discharge power limits and maximum allowable charge power limits.

The VSC may also be programmed to operate as a high-level controller that arbitrates output signals from one or more sub-controllers, and issue final wheel torque targets and torque output commands for each of the torque output devices. The VSC may also determine powertrain operating points to maintain battery state of charge, minimize fuel consumption and deliver the driver-demanded vehicle operation. A torque control (TC) feature within VSC determines a torque split between the engine 104, ISG 102, and electric motor 124. While certain subroutines and/or calculations may be performed by individual sub-controllers, such functions related to propulsion are discussed herein as being encompassed by the functionality of controller 136. In the example of FIG. 1, communicative connections to receive device sensor signals at the controller 136, as well as provide command signals from the controller 136 are illustrated by dashed lines.

Although a hierarchy of controllers is discussed above, other hierarchies of controllers are contemplated without deviating from the scope of the present disclosure. For example, differing configurations and authority relationships are contemplated that would be beneficial for different particular vehicles. Moreover, more or less controllers than those described herein are contemplated, and one or more of these controllers can communicatively cooperate to accomplish certain tasks. Any and all of these controllers or combination thereof can simply be referred to as a "controller".

Several powertrain components having geared connections including the transmission, gearbox, electric motor, and rear differential may each be subject to lash. Additionally, several of the torque transfer elements including the driveshaft and half shafts may exhibit compliance when under torque load. The example hybrid architecture of FIG. 1 including an electric motor connected at the P3 location may have both lash and compliance components distributed along the driveline. Rapid increases or decreases in torque can excite the natural frequency of the driveline. Similarly, rapid changes between positive and negative torque transmitted through a connection subject to lash can cause driveline clunk and excite the driveline. For a powertrain system with torque actuators in multiple locations and multiple lash paths, shaping the torque commands of each individual actuator to simultaneously manage the driveline, maximize system efficiency and promptly respond to driver demand presents unique challenges. When the transmission is engaged, all of the actuators are physically connected to the same driveline and therefore share a common dynamic system response.

According to some examples, vehicle controls are provided to ensure the sum of the torque contributions of all individual actuators is appropriately shaped to avoid driveline excitation. An initial determination by the vehicle controls may include determining a steady-state torque split to provide an optimal trade-off between vehicle performance, system efficiency and drivability. Additional shaping and/or other adjustments may be required to manage transients which is particularly important in hybrid vehicle having a motor connected at the P3 location. Rapid changes in either the total torque demand, or rapid changes in the torque split between devices upstream and downstream of the transmission can result in the driveline system crossing lash at multiple locations.

Referring to FIG. 2A through FIG. 2C, the of plots 200, 220, and 240 illustrate an example of how a hybrid propulsion system according to the present disclosure determines a desired wheel torque slew rate, then shapes the overall wheel torque request in response to a driver accelerator pedal tip-in. Each of the plots 200, 220, and 240 correspond to each other with respect to time. Plot 200 depicts an overlay of a driver torque request due to tip in, along with a step function wheel torque request along with a modified shaped total wheel torque request. Horizontal axis 202 represents time in seconds, and vertical axis 204 represents wheel torque in N-m. During an accelerator tip-in or tip-out, a propulsion system according to the present disclosure senses the change in the driver torque request (with respect to requested torque at the start of the tip-in), then identifies a desired tip-in or tip-out duration. The desired duration depends on the natural frequency of the driveline which varies with the transmission gear and the transmission engagement state (i.e., whether engaged or disengaged) and other factors such as rate of change of accelerator pedal and selectable driver mode (SDM). In general, the desired duration is approximately equal to one resonance period of the driveline.

In the example of plot 200, curve 206 represents a driver wheel torque request applied over time. At time t1 the driver applies the acceleration pedal (i.e., tip-in). Based on response characteristics of the vehicle, the system determines a desired tip-in duration $\Delta t$.

Referring to plot 220 of FIG. 2B, curve 210 represents the amount of torque change required, $\Delta \tau$ for the current tip-in event plotted over time. As can be seen in example of plot 220, prior to the tip in event (e.g., t<t1), as well as after the shaped wheel torque request catches up to the desired wheel torque (e.g., t>t3), no change in wheel torque is required.

Referring to plot 240 of FIG. 2C, the desired torque slew rate is plotted over time. Vertical axis 212 is the rate of change of torque over time in N-m/s. Curve 218 (extended to coincide with 214) represents the desired rate of change torque calculated by taking the torque change 210 and dividing by the desired tip-in duration $\Delta t$. Additional modifications may be performed to further control the allowed wheel torque slew rate. For example, when the wheel torque slew rate is near zero, additional shaping may be applied. For example, a minimum torque slew rate 216 may be applied during the tip-in event in order to enhance system responsiveness. More specifically, at region 218 where the slew rate is very small, the system may be capable of accepting a higher rate of change without causing disturbances. Therefore, when the shaped wheel torque slew rate 218 is near zero, an initial spike may be applied to quickly increase the slew rate to the minimum rate 216. In this way, a quicker response may be achieved relative to the system response corresponding to the slew rate associated with region 218. Curve 214 depicts a final modified desired wheel torque slew rate over the duration of the tip-in event. Curve 208 represents the final shaped wheel torque request. The slope of curve 208 is generally equal to the desired torque rat of change curve 214.

After determining the overall desired wheel torque and the corresponding desired wheel torque slew rate to satisfy driver torque demand, the propulsion system of the present disclosure continuously calculates the desired steady-state torque split between actuators. The desired steady-state torque split depends on many factors including driver demand, vehicle speed, battery state of change, battery power limits, component efficiencies, component temperatures and selectable drive mode (e.g., performance mode, economy mode, regenerative braking, etc.). The desired steady-state torque split can change abruptly for a number of reasons including a powertrain state change (e.g., engine state change to on/off, transmission gear change, etc.) or a driver demand change (e.g., tip-in, tip-out, braking, etc.). During these types of transients, a propulsion system according to the present disclosure may transition towards a new steady-state torque allocation based on the desired total wheel torque slew rate, current power flow direction of the actuators (charge/discharge), the lash states of individual actuators of the system, the nominal response rate of particular actuators, and the torque capability of the actuators.

Referring to FIG. 3, the slew rates of individual actuators are selected such that the total wheel torque is slewed at the desired rate. Plot 300 depicts limits on an individual actuator's slew rate based on the relationship to the desired wheel torque slew rate. Specifically, the allowable change in the torque output from a particular actuator is limited as a function of the desired wheel torque slew rate. This enables any single actuator to follow changes in driver demand but limits the rate of torque swapping between actuators. Horizontal Axis 302 represents desired wheel torque slew rate, and vertical axis 304 represents torque slew rate of an individual actuator. Curve 306 represents an idealized curve where the slew rate of the individual actuator is equal to the wheel torque slew rate (i.e., a 1:1 ratio). Practically, due to transient conditions as discussed above, it may be desirable to set the slew rate of the individual actuator to be greater than or less than the wheel torque slew rate. Curve 308 represents an upper rate of change limit of the individual actuator. Conversely, curve 310 represents a lower rate of change limit of the individual actuator. As can be seen from plot 300, the allowable rate of torque swapping is lower when wheel torque demand is constant or slowly changing (i.e., desired wheel torque slew smaller magnitude and near zero). Under such circumstances slew rate of each actuator is more strictly limited because disturbances are more perceivable and objectionable when the system changes are smaller. Notably, and as discussed in more detail below, an individual actuator is allowed to operate with a zero slew rate under all desired wheel torque values to help manage lash crossing events.

A propulsion system according to the present disclosure actively monitors the twist across the transmission gearbox, the electric motor gearbox, and the final drive to detect their lash states (i.e., whether in negative contact, in lash, or in positive contact). When one of these driveline components cross lash, wheel torque may be slewed slower with an objective of minimizing the impact speed when contact is reached during a gear engagement. A further objective is to prevent lash crossing of each of the various geared connections from occurring at the same time.

One of the objectives of the algorithms of the present disclosure is to control slew rate allocation such that each of the propulsion electric motor torque and the transmission assembly input torque undergoes lash crossings at a different point in time. In a specific example, the system adjusts the torque slew rates of the transmission assembly input torque and the P3 motor torque to ensure they cross lash at different points in time. When the transmission is crossing lash, the system prioritizes controlling the slew rate of the propulsion electric motor to ensure smooth delivery of torque to the wheels. Conversely, when the electric motor gearbox is crossing lash, the system prioritizes controlling the slew rate of transmission assembly input torque. This enables the system to more promptly and consistently respond to driver torque requests. When crossing lash, the overall wheel torque slew rate is controlled to be reduced with the objective of minimizing the impact speed when gearing contact is reached. If both of these lash crossings were to occur at the same time, then zero torque would be transmitted to the wheels for a period until one of the actuators crosses lash and the lash in the final drive is crossed, causing undesirable hesitation. In the example of a tip-in from a coasting condition, separating the lash crossing events avoids this simultaneous lash condition, and thus improves the time to peak acceleration by as much as 200 ms (the time required for the transmission gearbox or motor gearbox to cross lash).

The timing of engine torque application affects both vehicle acceleration performance and system efficiency, and it may be desirable to vary the timing depending on the operating mode. In a vehicle performance mode, acceleration can be maximized by slewing engine torque to its desired torque at a higher priority relative to the other actuators because the torque response of the engine is generally slower than the electric machines. In economy-focused modes, system efficiency may be maximized by slewing engine torque slowly enough to achieve optimal air path control (e.g., maintaining optimal cam timing). According to other examples such as when one electric machine is generating and the other electric machine is operating as a motor, the propulsion system may prioritize electric machine slewing to manage lash crossings. More specifically, during certain engine start events, it is common for the ISG torque at the engine connection to be negative while the P3 electric motor torque is positive. In response, the propulsion system may prioritize removing this negative ISG torque prior to increasing engine torque or P3 electric motor torque.

Figure 4:
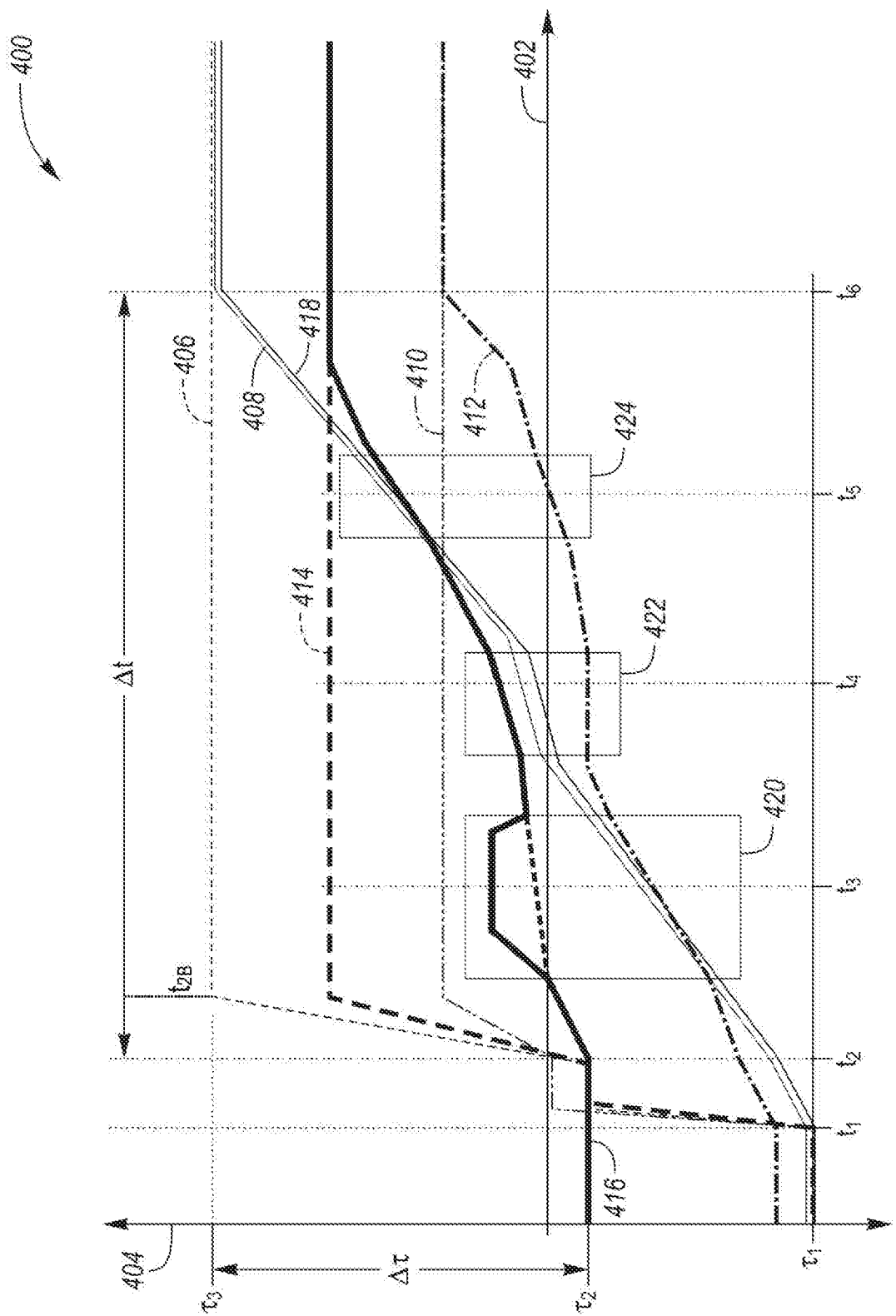
FIG. 4 is a plot of torque versus time.

Referring to FIG. 4, plot 400 represents various aspects of system performance while applying one or more torque-shaping algorithms. Horizontal axis 402 represents time and vertical axis 404 represents torque in N-m. Curve 406 represents driver torque demand and curve 408 represents the total wheel torque, where prior to time t1 the driver applied the brake pedal causing the application of negative torque τ1 at the wheels to decelerate the vehicle. Curve 410 represents an ideal desired P3 electric motor torque request and curve 412 represents a shaped P3 electric motor torque request according to the present disclosure. In the example of plot 400, negative motor torque is applied prior to time t1 such as during regenerative braking.

Curve 414 represents an ideal desired transmission input torque from all actuators upstream of the transmission, and curve 416 represents a transmission input torque request. In examples of the architectures discussed above, curves 414 and 416 may account for torque inputs from the ISG and the engine. The combination of torque output from the actuators upstream of the transmission (ideal curve 414, shaped curve 416) and the P3 electric motor (ideal curve 410, shaped curve 412) results in the overall wheel torque output (ideal curve 406, shaped curve 408). The shaped curves correspond to each other and depict example applications of lash crossing management strategies of the present disclosure. For simplicity, in the example of plot 400 the torque ratios of both transmission and P3 electric motor gearbox are 1:1. It should be appreciated that when different ratios are implemented the shaping of desired torques to manage lash crossings may differ from the example depiction of plot 400.

The shaped total wheel torque request of curve 408 is the ideal wheel torque that is instantaneously calculated on an ongoing basis. A shaped primary axle torque request is represented by curve 418, and is the desired torque to be applied through the primary axle and includes additional shaping to manage lash crossings in the final drive. The value of curve 408 is calculated based on the preceding value of curve 418. The change between the old value of 418 and the new value of 408 is always constant from t2b to t6. While this time range is used by way of an illustrative example, it should be appreciated that the propulsion system of the present disclosure undergoes torque shaping on an ongoing basis in response to changes in driver torque demand. Specifically, although not described herein similar torque modification algorithms are applied between t1 and t2 in response to driver release of the brake pedal and prior to tip-in of the accelerator pedal.

At time t1, the driver releases the brake pedal indicating the desire for less deceleration and the driver torque demand represented by curve 406 becomes less negative to target wheel torque τ2. At the same time, the ideal desired P3 electric motor torque request represented by curve 412 goes to zero torque. The propulsion system determines the desired wheel torque slew rate and determines the overall duration Δt required to achieve a smooth transition.

From time t2 to t2B, the driver applies the accelerator pedal indicating an overall driver demand increase from τ2 to τ3 at the wheels. Stated differently, curve 406 representing driver demand quickly increases Δτ from time t1 to t2B. The system also determines the allocation between the engine, ISG, and electric motor. At time t2 each of curve 410 representing ideal electric motor output and curve 414 representing ideal torque input to the transmission are increased to represent the allocation to provide the desired wheel torque. The smoothing applied to each of the ideal curves influences the torque slew rate allocation between the transmission assembly input torque path and the P3 electric motor path such that the transmission assembly input torque path will reach 0 N-m first.

As the transmission assembly input torque approaches 0 N-m, the lash crossing algorithm shapes the transmission input torque request (curve 416) to cross lash. Region 420 represents the application of a first lash crossing management strategy. The transmission input torque request is increased above 0 N-m to accelerate the input gear through lash. According to the example of plot 400, the transmission gearbox crosses lash at time t3. Just prior to the transmission gearbox input gear contacting the output gear, the transmission assembly input torque request is decreased to a near zero torque request. This approach minimizes the lash crossing time and the impact speed when the input gear contacts the output gear. While the transmission assembly input is crossing lash, the assumed torque in the transmission assembly input path is near zero but has a slight positive slope. When the input gear contacts the output gear, the torque delivered through the transmission path is a small positive value. The small positive slope results in the system slightly under-delivering driver demand while lash is being crossed but ensures the delivered torque nearly matches the requested torque when lash is crossed (and the torque through the transmission path step increases to a small positive value). The technique depicted in region 420 shows a quick acceleration resulting from an over-torque through lash, then a deceleration to soften gear contact on the trailing end of the lash crossing. It should be appreciated that while the first lash crossing management strategy is described with respect to the engine, it may be applied to any of the torque connections along the driveline as they undergo a lash crossing. According to some examples, the controller is programmed to, in response to anticipating a lash crossing of at least one of the engine, electric motor, and ISG, increase a torque slew rate during a non-contact portion of the lash crossing, and decrease the torque slew rate ahead of a contact portion of the lash crossing.

While the transmission assembly input path is crossing lash around time t3, the shaped P3 electric motor torque request of curve 412 is slewed to substantially match the shaped wheel torque request of curve 408. After the transmission assembly input path has crossed lashed, both the P3 electric motor torque request of curve 412 and the transmission input torque request of curve 416 are increased.

With continued reference to FIG. 4, when the total wheel torque request approaches 0 N-m, the system begins shaping the torque through the primary axle of curve 418 to manage the lash in the final drive. Region 422 represents the application of a second lash crossing management strategy. According to the example of plot 400, the differential of the final drive crosses lash at time t4. In this case, the lash crossing in final drive is managed by slewing the primary axle torque request of curve 418 more slowly beginning prior to the lash crossing. The rate of change of the value of 418 is substantially constant before and after the lash crossing of the final drive unit and equal to the rate of change of curve 408. However, during the lash crossing which occurs during region 422, the rate of change of the primary axle torque request is reduced. At the same time, while this lash crossing is occurring, the system holds the P3 torque request constant and only increases the transmission assembly input torque request. Stated differently, the technique depicted in region 422 includes setting the torque slew rate of the electric motor to substantially zero while the final drive differential crosses lash. It should be appreciated that while the second lash crossing management strategy is described with respect to the final drive, it may be applied to any of the torque connections along the driveline as they undergo a lash crossing.

One advantage of the second lash crossing management strategy is that it may be easier to manage a lash crossing via a single actuator rather than multiple actuators simultaneously related to reduced uncertainty. A second advantage is that the technique ensures that the system does not undergo lash crossings at multiple locations at the same time. That is, the control system ensures that each of the P3 electric motor and the differential undergoes lash crossings at different points in time. Once the lash in the final drive differential is crossed, the system resumes increasing torque output of both of the transmission assembly input request of curve 416 and P3 electric motor torque request of 412.

Once the P3 electric motor torque approaches 0 N-m, the system begins shaping the P3 electric motor torque request of curve 412 to manage the lash crossing of the of P3 electric motor gearbox. Region 424 represents the application of a third lash crossing management strategy. In the example of plot 400, the system manages the electric motor lash by slewing the motor torque more slowly. While the lash is crossed in the P3 electric motor gearbox, the transmission assembly input torque request of curve 416 is increased proportionally to the shaped wheel torque request of curve 408. Once lash is crossed the system finishes ramping up both of the transmission input torque request of curve 416 and the P3 electric motor torque request of curve 412 to their desired steady-state torque splits (curve 414 and curve 410, respectively). It should be appreciated that the transmission torque input and the P3 electric motor torque output need not reach their steady-state target values at the same time. In the example of plot 400, the engine reaches its target before the P3 electric motor does.

The example of plot 400 of FIG. 4 illustrates at least three different lash crossing management strategies. A first management strategy includes accelerating a first actuator through a non-contact portion of a lash crossing, then decelerating the first actuator prior to gear contact at the trailing end of the lash crossing. The first strategy may also include matching a torque slew rate of a second actuator to a lash rate of an overall shaped wheel torque request while the first actuator crosses lash.

A second strategy includes, in response to detecting a first actuator imminent lash crossing, setting a torque slew rate of a second actuator to substantially zero while the first actuator crosses lash.

A third strategy includes, in response to detecting a first actuator imminent lash crossing, setting a torque slew rate of a second actuator to match a lash rate of an overall shaped wheel torque request while the first actuator crosses lash. Any of strategies presented herein could be applied to manage lash crossings of any driveline system elements that are subject to lash. Moreover, the sequence in which certain devices cross lash in plot 400 is merely exemplary. In certain propulsion system architectures and/or under certain performance objectives, it may be desirable to have the different elements cross lash in a different sequence.

Figure 5A:
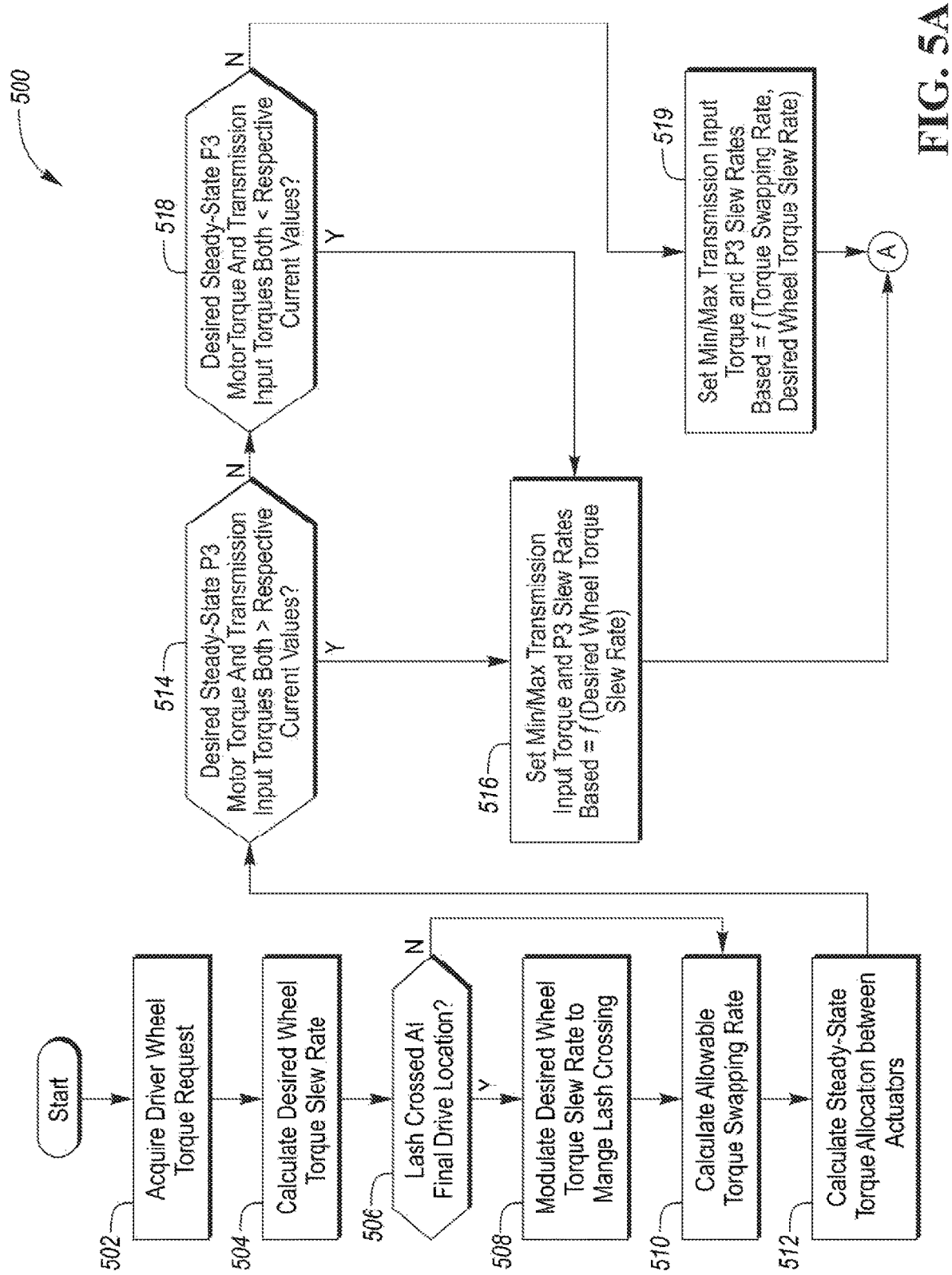
Figure 5C:
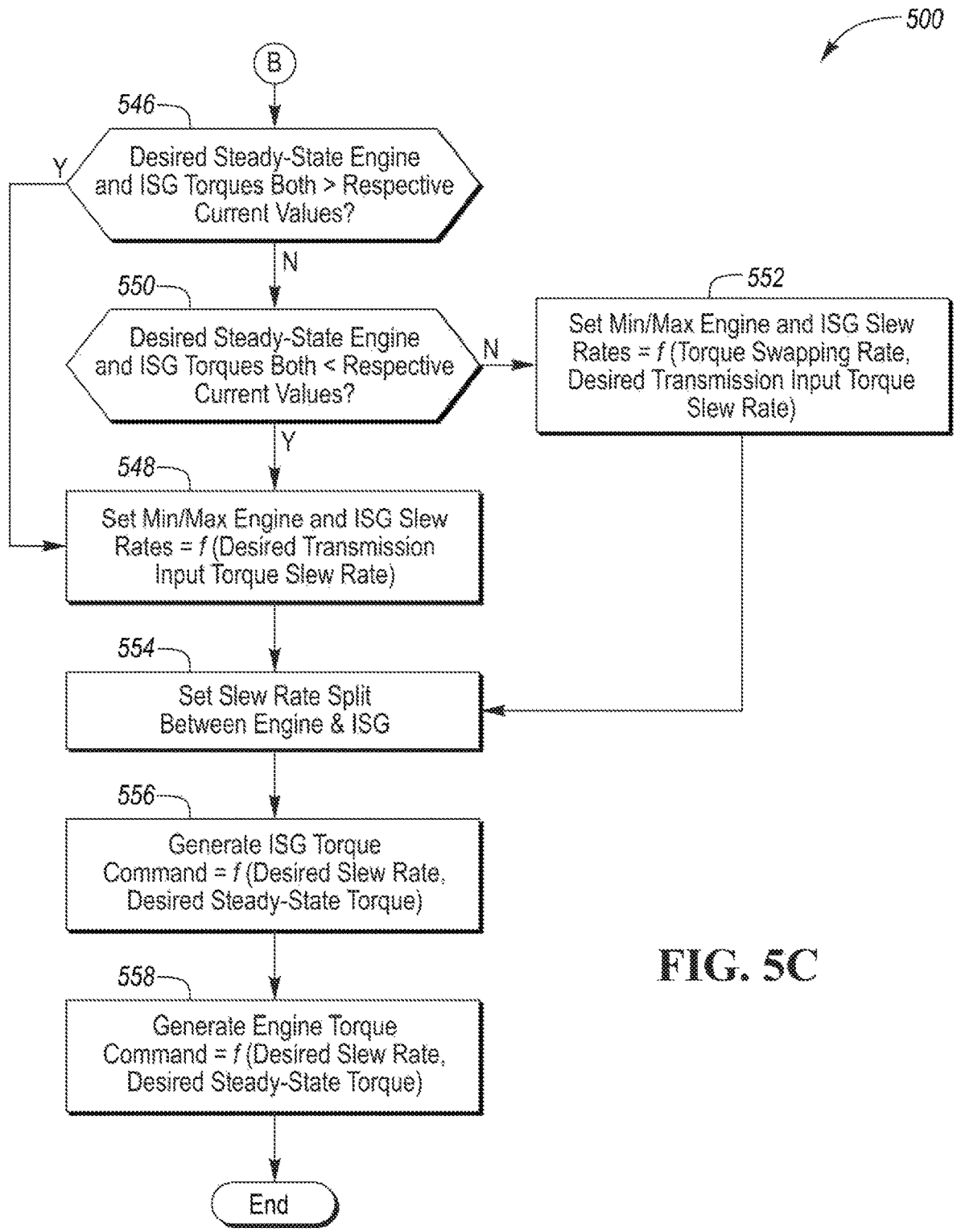

Referring to FIG. 5, flow chart 500 represents algorithm to perform lash management strategies as discussed herein. At step 502 the algorithm includes acquiring a driver wheel torque request. As discussed above the driver request may be indicated by an accelerator pedal tip-in, accelerator pedal tip-out, and/or brake pedal application.

At step 504 the algorithm includes acquiring a desired wheel torque slew rate. As discussed above, this may include calculating an overall required change in torque $\Delta\tau$ and selecting an overall duration $\Delta t$ over which the torque change is to occur.

At step 506 the algorithm includes sensing whether a lash crossing at the final drive unit is occurring or imminent. If at step 506 a final drive lash crossing is occurring, the algorithm includes at step 508 modulating wheel torque slew rate as the final drive crosses lash. Once the final drive lash crossing If at step 506 the final drive is not crossing lash, the algorithm includes calculating at step 510 the allowable torque swapping rate between multiple actuators. As discussed above, and in reference to FIG. 3, the slew rate limit of each particular device may be tied to be within a threshold of the desired overall wheel slew rate.

At step 512 the algorithm includes calculating a steady-state torque allocation between a plurality of torque actuators along the driveline. As discussed above, this may include outputting torque from any of a combination of actuators, such as an ISG, engine, and electric motor.

Once steady-state torque allocation between the engine and electric motor is calculated, the algorithm includes at step 514 assessing whether each of the desired steady-state engine output torque and the steady-state P3 electric motor output torque are both greater than their respective current values. If both desired values are greater than their current respective values then both require an increase to meet demand and disturbances due to torque swapping between actuators may not be of concern. Thus, if at step 514 both the desired steady-state torque of the transmission input torque as well as the desired steady-state torque of the P3 electric motor are greater than their respective current values, the algorithm includes at step 516 setting slew rate limits of the transmission input torque and P3 electric motor output based on the overall wheel torque slew rate. In this case since both values require an increase in magnitude, torque swapping limits may not come into play.

If at step 514 at least one of the desired steady-state torque of the transmission input torque as well as the desired steady-state torque of the P3 electric motor is less than its respective current value, the algorithm includes at step 518 assessing whether each of the desired steady-state engine output torque and the steady-state P3 electric motor output torque are both less than their respective current values. As discussed above, if the required torque adjustment is in the same direction for both, torque swapping limits may be neglected when setting the slew rates. The algorithm returns to step 516 and sets slew rate limits of the transmission input torque and the P3 electric motor output torque based on the overall wheel torque slew rate.

If at step 518 at least one of the desired steady-state torque of the transmission input torque as well as the desired steady-state torque of the P3 electric motor is less than its respective current value, it is an indication that one of the torque outputs requires an increase and the other of the torque outputs requires a decrease. Thus the algorithm includes at step 519 setting the maximum (or minimum) slew rate limits of the transmission input torque and P3 electric motor output torque based on the overall wheel torque slew rate, as well as torque swapping rate limits. Since at least one of the desired values is less than the current value, torque swapping limits may restrict how quickly one or both of the actuators may transition toward the corresponding desired steady-state allocated value. According to some examples the controller is programmed to, in response to a first slew rate of one of the engine and electric motor being positive and a second slew rate of the other of the engine and electric motor being negative, limit the engine slew rate and the P3 electric motor slew rate to be within a predetermined threshold of a desired wheel torque slew rate.

At step 520 the algorithm includes detecting whether a P3 electric motor lash crossing is present or imminent. According to at least one example, a lash crossing may be detected by sensing a torque value at the electric motor and detecting a lash crossing based on sensed torque approaching zero.

If at step 520 the electric motor is crossing lash, the algorithm includes at step 522 calculating a slew rate split between the transmission torque input request and the P3 electric motor request by prioritizing transmission input torque slew rate. As discussed above, this may include setting the slew rate of the transmission to a predetermined slew rate while the motor is crossing lash. According to a specific example, the transmission slew rate is set to zero while the motor crosses lash.

At step 524 the algorithm includes setting the transmission input torque command as a function of the desired transmission slew rate and the target steady-state torque split between the actuators.

Once the torque command for the transmission is set, the algorithm includes at step 526 modulating the P3 electric motor torque to manage the lash crossing event. In some examples, this includes reducing the motor torque slew rate as the motor crosses lash.

If at step 520 the P3 electric motor is not crossing lash, the algorithm includes at step 528 detecting whether a transmission input torque lash crossing is present or imminent. If at step 528 the transmission is crossing lash, the algorithm includes at step 530 calculating a slew rate split between the transmission torque input request and the P3 electric motor request by prioritizing the electric motor slew rate. As discussed above, this may include setting the slew rate of the electric motor to a predetermined slew rate while the transmission is crossing lash. According to a specific example, the electric motor slew rate is set to match the overall wheel torque slew rate while the transmission crosses lash.

At step 532 the algorithm includes setting the P3 electric motor torque command as a function of the desired motor slew rate and the target steady-state torque split between the actuators.

Once the torque command for the P3 electric motor is set, the algorithm includes at step 534 modulating the transmission input torque to manage the lash crossing event. In some examples, this includes reducing the transmission input torque slew rate as the transmission crosses lash.

If at step 528 the transmission is not crossing lash, the algorithm includes detecting whether the vehicle is in a special operating mode that would require modification of torque commands to achieve both smooth operation and the objectives of the special operating mode. According to the example of FIG. 5, if at step 536 the vehicle is in a performance mode, the algorithm includes at step 538 calculating the torque slew rate split based on prioritizing at least one of the highest torque capability actuator and/or the slowest responding actuator. Performance mode includes getting engine output to the desired torque output as quickly as possible. Generally, the engine provides a slower response to requests for rapid torque changes as compared to an electric motor. Thus step 538 may include prioritizing engine output to force the engine to cross lash prior to other torque actuators.

At step 540 the algorithm includes setting the transmission input torque command as a function of the desired transmission slew rate and the target steady-state torque split between the actuators. At step 542 the algorithm includes setting the P3 electric motor torque command as a function of the desired motor slew rate and the target steady-state torque split between the actuators.

Once torque commands for the engine and electric motor are set, the algorithm includes at step 546 assessing whether each of the desired steady-state engine output torque and the steady-state ISG output torque are both greater than their respective current values. If both desired values are greater than their current respective values then both require an increase to meet demand and disturbances due to torque swapping between actuators may not be of concern. That is, at step 548 the algorithm includes setting the maximum (or minimum) torque slew rates of each of the engine and ISG based on the desired transmission input torque slew rate downstream of the engine and ISG.

If at step 546 each of the steady-state engine output torque and the steady-state ISG torque are not both greater than their respective current values, the algorithm includes assessing whether both desired values are less than their respective current values. If at step 550 each of the steady-state engine output torque and the steady-state ISG torque are both less than their respective current values, it indicates that both require reduction from their current state and thus torque swapping limits may not come into play when determining torque slew rates. The algorithm includes at step 548 the algorithm includes setting the maximum (or minimum) torque slew rates of each of the engine and ISG based on the desired transmission input torque slew rate downstream of the engine and ISG.

If at step 550 the steady-state engine output torque and the steady-state ISG torque are not both less than their respective current values, it indicates that one of the torque outputs requires an increase and the other of the torque outputs requires a decrease. Thus at step 552 the algorithm includes setting the maximum (or minimum) torque slew rates of each of the engine and ISG based on the desired transmission input torque slew rate downstream of the engine and ISG, as well as a maximum allowed torque swapping rate. As discussed above, it may be desirable slew torque of any single actuator to follow changes in driver demand but at the same time limit the rate of torque swapping between actuators. Stated another way, the allowable rate of torque swapping between actuators, and thus the corresponding slew rates, may be more strictly limited when wheel torque demand is constant or slowly changing (i.e., desired wheel torque slew smaller magnitude and near zero). According to some examples, the controller is programmed to, in response to a first slew rate of one of the engine and ISG being positive and a second slew rate of the other one of the engine and ISG being negative, limit slew rates of each of the engine and ISG based on a maximum allowed torque swapping rate.

At step 554 the algorithm includes setting the torque slew rate split between the engine and the ISG based on the allowed maximum (or minimum) slew rates determined in step 548 and/or step 552 discussed above.

At step 556 the algorithm includes generating a torque command for the ISG based the desired slew rate of the ISG and the desired steady-state torque of the ISG. It should be appreciated that activating the ISG may aid the engine in a quicker ramp-up of torque output. At step 558 the algorithm includes generating a torque command for the engine based the desired slew rate of the engine and the desired steady-state torque of the engine.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle propulsion system to generate wheel torque comprising:
   an engine arranged to output a first propulsion torque to a transmission;
   an electric motor arranged to output a second propulsion torque downstream of the transmission; and
   a controller programmed to,
      in response to detecting a lash crossing associated with one of the electric motor and the transmission, set a torque slew rate of the other one of the electric motor and transmission to prevent lash crossing of the other of the motor and transmission during the detected lash crossing, and in response to a first slew rate of one of the engine and electric motor being positive and a second slew rate of the other of the engine and electric motor being negative, limit the first and second slew rates to be within a predetermined threshold of a desired wheel torque slew rate.

2. The vehicle propulsion system of claim 1 wherein the controller is further programmed to, while the one of the electric motor and the transmission input torque undergoes a lash crossing, increase a magnitude of the torque slew rate of the other one of the electric motor and the transmission to match a desired wheel torque slew rate.

3. The vehicle propulsion system of claim 1 wherein the controller is further programmed to, while the one of the electric motor and the transmission undergoes a lash crossing, reduce a magnitude of the torque slew rate of the one of the electric motor and the transmission, and set a slew rate of the other one of the electric motor and the transmission to match a desired wheel torque slew rate.

4. The vehicle propulsion system of claim 1 further comprising an integrated starter generator (ISG) coupled to the engine wherein the controller is further programmed to, in response to a first slew rate of one of the engine and ISG being positive and a second slew rate of the other of the engine and ISG being negative, limit slew rates of each of the engine and ISG based on a maximum allowed torque swapping rate.

5. The vehicle propulsion system of claim 4 wherein the maximum allowed torque swapping rate is based on a predetermined deviation from a desired wheel torque slew rate.

6. The vehicle propulsion system of claim 1 wherein the controller is further programmed to cause the engine to undergo a lash crossing prior to the electric motor undergoing a lash crossing during acceleration.

7. A vehicle propulsion system comprising:
an engine arranged to output a first propulsion torque to a final drive unit through a transmission;
an electric motor arranged to output a second propulsion torque to the final drive unit through a motor gearbox downstream of the transmission;
an integrated starter generator (ISG) arranged to output a third propulsion torque to the final drive unit through the transmission; and
a controller programmed to
allocate output between the first, second, and third propulsion torques to satisfy a desired wheel torque and cause the transmission, motor gearbox, and the final drive unit to each undergo a lash crossing at different times,
cause the engine to undergo a lash crossing prior to the electric motor undergoing a lash crossing during acceleration, and
in response to a first slew rate of one of the engine and ISG being positive and a second slew rate of the other of the engine and ISG being negative, limit slew rates of each of the engine and ISG based on a maximum allowed torque swapping rate.

8. The vehicle propulsion system of claim 7 wherein the controller is further programmed to, in response to the final drive unit approaching a lash crossing, set a torque slew rate of one of the second propulsion torque and a transmission input torque to match a slew rate of the desired wheel torque.

9. The vehicle propulsion system of claim 8 wherein the torque slew rate of the other of the second propulsion torque and a transmission input torque is set to zero.

10. The vehicle propulsion system of claim 7 wherein the maximum allowed torque swapping rate is based on a predetermined deviation from a desired wheel torque slew rate.

11. The vehicle propulsion system of claim 7 wherein the controller is further programmed to, in response to detecting a lash crossing of at least one of the engine, electric motor, and ISG, increase a torque magnitude during a non-contact portion of the lash crossing, and decrease the torque magnitude prior to a contact portion of the lash crossing.

12. The vehicle propulsion system of claim 7 wherein the controller is further programmed to detect a lash crossing of at least one of the transmission, the electric motor, and the final drive unit based on a difference between an input speed and an output speed of the at least one of the transmission, the electric motor, and the final drive unit.

13. A method for controlling propulsion system torque output comprising:
setting a target torque output allocation between an engine and an electric motor to satisfy a driver torque demand, wherein the engine is upstream of a transmission and the electric motor is downstream of the transmission;
in response to one of an engine connection and an electric motor connection undergoing a lash crossing, setting a torque slew rate of the other of the engine and electric motor to cause each of the engine connection and electric motor connection to undergo lash crossings at different points in time; and
in response to a first slew rate of one of the engine and electric motor being positive and a second slew rate of the other of the engine and electric motor being negative, limiting the first and second slew rates to be within a predetermined threshold of a desired wheel torque slew rate.

14. The method of claim 13 wherein while the one of the engine connection and the electric motor connection undergoing a lash crossing, the torque slew rate of the other of the engine and electric motor is set to zero.

15. The method of claim 13 wherein while the one of the engine connection and the electric motor connection undergoing a lash crossing, the torque slew rate of the other of the engine and electric motor is set to match a desired wheel torque slew rate.

16. The method of claim 13 causing the engine connection to undergo a lash crossing prior to the electric motor connection undergoing a lash crossing during acceleration.

* * * * *